United States Patent Office 3,332,941
Patented July 25, 1967

3,332,941
17-ETHER COMPOUNDS OF 17β-HYDROXY-5α-ANDROSTANO [2,3-c] FURAZAN
Masao Shimizu, Genkichi Ohta, and Katsujiro Ueno, Tokyo, and Toshio Takegoshi, Ichikawa-shi, Japan, assignors to Daiichi Seiyaku Company Limited, Tokyo, Japan, a corporation of Japan
No Drawing. Filed Sept. 30, 1965, Ser. No. 491,863
Claims priority, application Japan, June 1, 1965, 40/32,369
1 Claim. (Cl. 260—239.55)

The present invention relates to novel androstane compounds.

More particularly the present invention relates to novel steroid [2,3-c] furazan compounds in which 3'- and 4'-positions of a furazan ring are fused to 2- and 3-positions of the steroid nucleus possessing a substituted-oxy group at the 17-position. These substances can be represented by the structural formula:

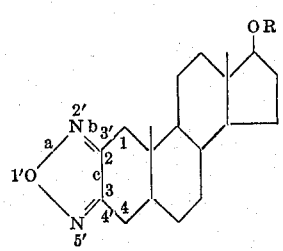

wherein R represents cyclopent-1'-enyl or tetrahydropyran-2'-yl group.

The compounds of the present invention, 17β-cyclopent-1'-enyloxy-5α-androstano [2,3-c] furazan and 17β-tetrahydropyran-2'-yloxy-5α-androstano [2,3-c] furazan were found to be excellent orally active anabolic agents having potent myotrophic and weak androgenic activities. The myotrophic activity was estimated by the increase in weight of the levator ani muscle of immature castrated male rats, and the androgenic activity by the increase in weight of ventral prostate and seminal vesicles.

Thus, in oral assay 17β-cyclopent-1'-enyloxy-5α-androstano [2,3-c] furazan showed a value of 3.3 times as myotrophic and 0.77 times as androgenic compared with the reference standard of methyltestosterone, and 17β-tetrahydropyran-2'-yloxy - 5α - androstano [2,3-c] furazan showed a value of 0.95 times as myotrophic and 0.21 times as androgenic compared with methyltestosterone.

Anabolic hormones are useful for the treatment of cases which are caused by the poor utilization of nitrogen. Generally, however, anabolic hormones are accompanied by androgenic activity and, therefore, produce undesirable side effects. In this respect, the compounds of the present invention can be said to be excellent protein-anabolic agents because they have favorable anabolic-androgenic ratios.

The novel compounds of the present invention may be prepared by processes illustrated by the following equations:

(1)

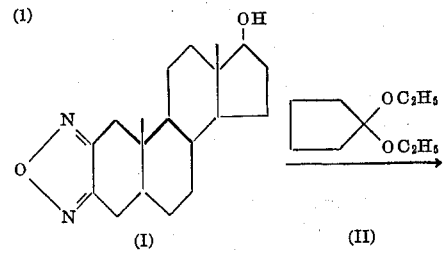

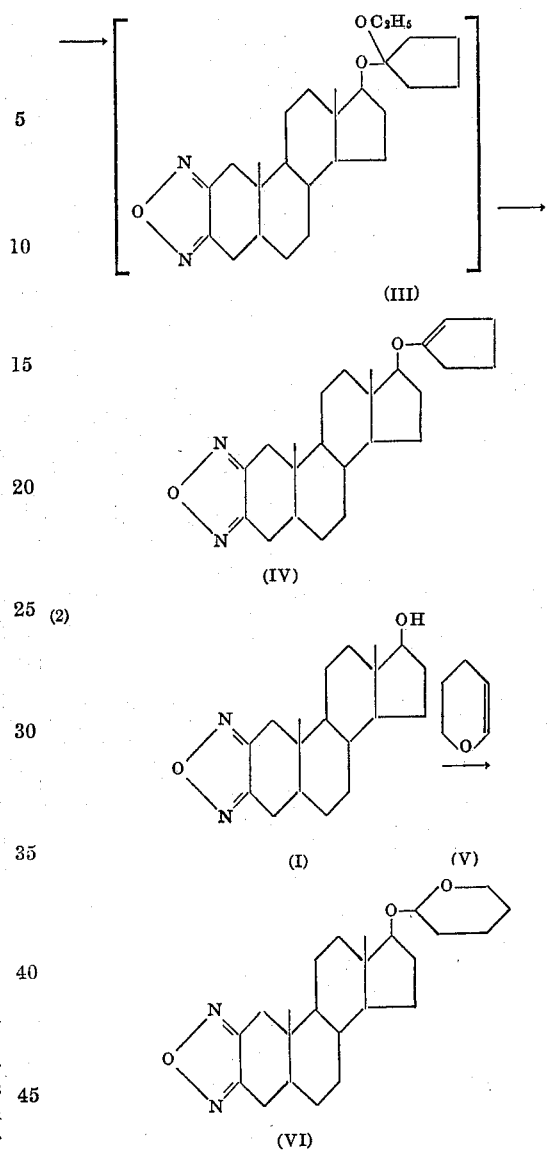

In practising the process (1) above outlined, the starting compound, 17β - hydroxy - 5α - androstano [2,3-c] furazan (I) is condensed with cyclopentanone diethylacetal (II) by heating, gradually raising the temperature from 130° up to 190° C., to directly produce the desired 17β-cyclopent-1'-enyloxy-5α-androstano [2,3-c] furazan (IV). During the course of the reaction, it is preferable to distill off the produced low-boiling substances.

In another embodiment of the preparation process of the present invention, an intermediate, 17β-(1'-ethoxy) cyclopentyloxy-5α-androstano [2,3-c] furazan (III) is prepared by heating a mixture of the compounds (I) and (II) at a temperature between 120° and 130° C., and then the compound (III), either isolated or not isolated, is heated, preferably in the presence of cyclopentanone diethylacetal, gradually raising the temperature from 130° up to 190° C.

The process (2) above outlined is practised by condensing 17β-hydroxy-5α-androstano [2,3-c] furazan (I) with 2,3-dihydropyran (V) at room temperature in an organic solvent such as ether or benzene in the presence of an acid such as p-toluenesulfonic acid, hydrochloric acid or sulfuric acid to produce the desired 17β-tetrahydropyran-2'-yloxy-5α-androstano [2,3-c] furazan (VI).

The starting compound 17β-hydroxy-5α-androstano [2,3-c] furazan (I) is prepared in accordance with the process disclosed in our co-pending application Serial No. 350,585 filed Mar. 9, 1964, now U.S. Patent No. 3,235,538, as follows:

17β-hydroxy-5α-androstano [2,3-c] furazan (I) is produced by a process which comprises reacting a 3-oxo-5α-androstane derivative of the formula:

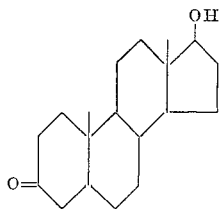

with an alkyl nitrite in the presence of an alkali or an acid to afford a 2-hydroxyimino-3-oxo-5α-androstane derivative of the formula:

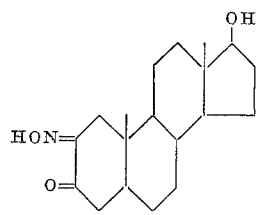

acting the produced compound with hydroxylamine give a 2,3-dihydroxyiminoandrostane compound of the formula:

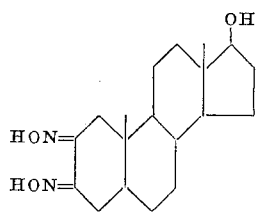

and then heating the latter in the presence of an alkali. The starting compound cyclopentanone diethylacetyl (II) (colorless oil, B.P. 64°–65.5° C./19 mm. Hg) is prepared by reacting cyclopentanone with ethyl orthoformate [J. Böeseken, F. Tellegen: Recueil des travaux chimiques des Pays-Bas, 57, 133 (1938)].

The other starting compound 2,3-dihydropyran (V) is well-known compound also about its preparation.

17β-cyclopent-1′-enyloxy-5α-androstano [2,3-c] furazan (IV) has a colorless and needle-shaped crystal system, soluble in both benzene and ether, soluble in alcohols at warm temperature, and has a melting point of 124°–126° C., [α]$_D$: +43.6° (in chloroform).

17β-tetrahydropyran-2′-yloxy-5α-androstano [2,3-c] furazan (IV) has a colorless and needle-shaped crystal system, is soluble in both benzene and ether, soluble in alcohols at warm temperature, and has a melting point of 110°–114° C.

The following examples will illustrate the invention more fully without limiting the invention thereto.

Example 1

A mixture of 0.32 g. of 17β-hydroxy-5α-androstano [2,3-c] furazan and 1.0 ml. of cyclopentanone diethylacetal was heated at a temperature between 130° and 150° C. for 30 minutes, then at a temperature between 155° and 180° C. for 15 minutes, and further at a temperature between 180° and 185° C. for 30 minutes. During the course of the reaction, the produced low-boiling substances were distilled off. The resulting product was dissolved in benzene and purified by passing through a column of alumina (8 g.). Recrystallization from a mixture of ether, methanol and a small amount of pyridine afforded 0.20 g. of 17β-cyclopent-1′-enyloxy-5α-androstano [2,3-c] furazan.

Elementary analysis. — Calcd. for $C_{26}H_{40}O_3N_2$: C, 75.35%; H, 8.96%; N, 7.32%. Found: C, 74.87%; H, 9.96%; N, 7.11%.

Example 2

A mixture of 0.32 g. of 17β-hydroxy-5α-androstano [2,3-c] furazan and 1.0 ml. of cyclopentanone diethylacetal was heated at a temperature between 120° and 125° C. for an hour, whereby the produced low-boiling substances were distilled off. The resulting product was dissolved in benzene, and purified by passing through a column of alumina (10 g.). Recrystallization from a mixture of ether and ethanol afforded 0.10 g. of 17β-(1′-ethoxy) cyclopentyloxy - 5α - androstano [2,3-c] furazan having a melting point of 120°–122° C., [α]$_D$: +45.3°· (in chloroform).

Elementary analysis.—Calcd. for $C_{26}H_{40}O_3N_2$: C, 72.86%; H, 9.41%; N, 6.54%. Found: C, 72.86%; H, 9.42%; N, 6.61%.

A mixture of 0.30 g. of thus produced 17β-(1′-ethoxy) cyclopentyloxy-5α-androstano [2,3-c] furazan and 1 ml. of cyclopentanone diethylacetal was gradually heated up to 180° C. and kept at this temperature for 30 minutes.

Treating the resulting product in the same manner as in Example 1 afforded 0.11 g. of 17β-cyclopent - 1′ - enyloxy-5α-androstano [2,3-c] furazan.

Example 3

To a solution of 1.42 g. of 17β-hydroxy-5α-androstano [2,3-c] furazan in 70 ml. of ether were added 6 ml. of 2,3-dihydropyran and 260 mg. of p-toluenesulfonic acid monohydrate. The mixture was allowed to stand at room temperature for an hour and a half. The reaction mixture was washed successively with saturated aqueous sodium bicarbonate and water, dried over anhydrous sodium sulfate and stripped of solvent at reduced pressure.

The residue was dissolved in benzene and passed through a column of alumina (30 g.). Recrystallization from methanol afforded 1.28 g. of 17β-tetrahydropyran-2′-yloxy-5α-androstano [2,3-c] furazan.

Elementary analysis. — Calcd. for $C_{24}H_{36}O_3N_2$: C, 71.96%; H, 9.06%; N, 6.99%. Found: C, 71.88%; H, 8.79%; N, 7.11%.

What is claimed is:

17β-cyclopent-1′-enyloxy-5α-androstano [2,3-c] furazan of the following formula:

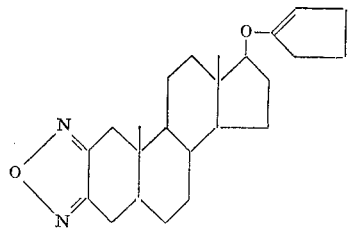

References Cited

UNITED STATES PATENTS

| | | | |
|---|---|---|---|
| 3,213,086 | 10/1965 | Cross | 260—239.55 |
| 3,239,511 | 3/1966 | Cross | 260—239.55 |
| 3,245,988 | 4/1966 | Ohta et al. | 260—239.55 |

LEWIS GOTTS, *Primary Examiner.*

E. L. ROBERTS, *Examiner.*

T. MESHBESHER, *Assistant Examiner.*